(12) United States Patent
Zhang

(10) Patent No.: US 10,645,483 B2
(45) Date of Patent: May 5, 2020

(54) HEAD-MOUNTED EQUIPMENT

(71) Applicant: GOERTEK TECHNOLOGY CO.,LTD., Qingdao, Shandong (CN)

(72) Inventor: Wenlai Zhang, Qingdao (CN)

(73) Assignee: GOERTEK TECHNOLOGY CO.,LTD., Qingdao (CN)

( * ) Notice: Subject to any disclaimer, the term of this patent is extended or adjusted under 35 U.S.C. 154(b) by 71 days.

(21) Appl. No.: 16/302,065

(22) PCT Filed: Dec. 18, 2017

(86) PCT No.: PCT/CN2017/117038
§ 371 (c)(1),
(2) Date: Nov. 15, 2018

(87) PCT Pub. No.: WO2019/085193
PCT Pub. Date: May 9, 2019

(65) Prior Publication Data
US 2019/0208310 A1 Jul. 4, 2019

(30) Foreign Application Priority Data
Oct. 31, 2017 (CN) .......................... 2017 1 1050504

(51) Int. Cl.
*H04R 1/10* (2006.01)
*H04R 1/02* (2006.01)
(Continued)

(52) U.S. Cl.
CPC ......... *H04R 1/1066* (2013.01); *G02B 27/017* (2013.01); *G06F 3/011* (2013.01); *H04R 1/02* (2013.01); *H04R 1/105* (2013.01)

(58) Field of Classification Search
CPC ........ H04R 1/1066; H04R 1/02; H04R 1/105; G02B 27/017; G06F 3/011
(Continued)

(56) References Cited

U.S. PATENT DOCUMENTS

| 2002/0083510 A1* | 7/2002 | Bavetta | ................. | A41D 13/05 2/209 |
| 2007/0008484 A1* | 1/2007 | Jannard | ................. | G02C 3/003 351/41 |

(Continued)

FOREIGN PATENT DOCUMENTS

| CN | 205266071 U | 5/2016 |
| CN | 205485056 U | 8/2016 |

(Continued)

*Primary Examiner* — Sean H Nguyen
(74) *Attorney, Agent, or Firm* — Maschoff Brennan

(57) ABSTRACT

Embodiments of the present invention provide a head-mounted equipment. The head-mounted equipment includes an equipment body, an accessory and a connecting assembly implementing detachable connection between the accessory and the equipment body, where the connecting assembly is arranged on the accessory; the connecting assembly includes a buckle structure and a spring pressing structure. A clamping groove structure adapted to the buckle structure is provided on the equipment body. When the buckle structure is clamped into the clamping groove structure, the spring pressing structure contacts with the equipment body and applies an elastic force in a first direction to the equipment body. Under the action of the elastic force in the first direction, the buckle structure applies pressure in a second direction to the clamping groove structure; and the first direction is opposite to the second direction.

20 Claims, 6 Drawing Sheets

(51) Int. Cl.
*G06F 3/01* (2006.01)
*G02B 27/01* (2006.01)
(58) Field of Classification Search
USPC .......................................................... 381/381
See application file for complete search history.

(56) References Cited

U.S. PATENT DOCUMENTS

| | | | |
|---|---|---|---|
| 2010/0008514 A1* | 1/2010 | Bates | A44B 11/005 381/77 |
| 2012/0105740 A1* | 5/2012 | Jannard | G02C 9/04 348/794 |
| 2012/0120636 A1* | 5/2012 | Wilt | F21V 21/084 362/105 |
| 2017/0195775 A1 | 7/2017 | Morris et al. | |
| 2017/0311064 A1 | 10/2017 | Miller et al. | |

FOREIGN PATENT DOCUMENTS

| | | |
|---|---|---|
| CN | 205610865 U | 9/2016 |
| CN | 205750111 U | 11/2016 |

\* cited by examiner

ID-MOUNTED EQUIPMENT

CROSS-REFERENCE TO RELATED APPLICATIONS

This application is a national stage of International Application No. PCT/CN2017/117038, filed on Dec. 18, 2017, which claims priority to Chinese Patent Application No. 201711050504.4, filed on Oct. 31, 2017. Both of the aforementioned applications are hereby incorporated by reference in their entireties.

TECHNICAL FIELD

The present invention relates to the field of head-mounted equipment technology, in particular to a head-mounted equipment.

BACKGROUND

Along with constant development of Virtual Reality (VR) and Augmented Reality (AR) technologies, science and technology enterprises have successively launched a wide variety of VR/AR head-mounted equipment and the head-mounted equipment may bring a realistic audio-visual experience to a user.

SUMMARY

An embodiment of the present invention provides a head-mounted equipment, which includes an equipment body, an accessory and a connecting assembly implementing detachable connection between the accessory and the equipment body, where the connecting assembly is arranged on the accessory; the connecting assembly includes a buckle structure and a spring pressing structure; a clamping groove structure adapted to the buckle structure is provided on the equipment body; when the buckle structure is clamped into the clamping groove structure, the spring pressing structure contacts with the equipment body and applies an elastic force in a first direction to the equipment body; under the action of the elastic force in the first direction, the buckle structure applies pressure in a second direction to the clamping groove structure; and the first direction is opposite to the second direction.

In some embodiments, the buckle structure includes two buckles and an annular elastic piece; and the two buckles are symmetrically arranged on an outer annular wall of the annular elastic piece, and the two buckles are positioned at the two ends of the annular elastic piece in a first diameter direction.

In some embodiments, the buckle includes a direct section portion, as well as a protruding portion and pressure applying portion which are arranged at the two ends of the direct section portion respectively; and each of the protruding portion and the pressure applying portion extends towards a direction far away from the annular elastic piece.

In some embodiments, two first fastening structures are provided on the outer annular wall of the annular elastic piece, and the two first fastening structures are positioned at the two ends of the annular elastic piece in the first diameter direction respectively; and second fastening structures adapted to the first fastening structures are provided on the end faces, facing the annular elastic piece, of the two buckles.

In some embodiments, semicircular elastic sections protruding towards the annular outer side are provided at two positions of the annular elastic piece in a second diameter direction; and the first diameter direction of the annular elastic piece is perpendicular to the second diameter direction of the annular elastic piece.

In some embodiments, the connecting assembly further includes a cylinder fixed on the accessory and a disk accommodated in the cylinder; the axis of the disk is overlapped with the axis of the cylinder; two first bumps are provided on the end face of the side, back on to the accessory, of the disk, and the two first bumps are positioned at the two ends of the disk in a first diameter direction respectively; a guide groove is formed in each of the two first bumps along the first diameter direction of the disk, and the pressure applying portions of the two buckles are arranged in the corresponding guide grooves respectively; and elongated first avoiding holes extending along a circumferential direction of a cylinder wall are formed in the cylinder wall of the cylinder, and the pressure applying portions extend out of the first avoiding holes.

In some embodiments, two second avoiding holes are symmetrically arranged on two positions of the disk in a second diameter direction thereof; the two second avoiding holes are cambered slotted holes concentric with the disk; the disk is connected with the cylinder through two first fixing screws inserted into the two second avoiding holes respectively, and the disk can rotate relative to the cylinder in an angle range defined by the cambered slotted holes; and the first diameter direction of the disk is perpendicular to the second diameter direction of the disk.

In some embodiments, the connecting assembly further includes a limiting ring; two limiting blocks are symmetrically arranged on an inner sidewall of the limiting ring along a diameter direction of the limiting ring, and first through holes are formed in the two limiting blocks respectively; the limiting ring is positioned between the cylinder and the disk, the limiting ring is sleeved on the disk, and the axis of the limiting ring is overlapped with the axis of the disk; and the first fixing screws sequentially penetrate through the first through holes and the second avoiding holes to fix the limiting ring on the cylinder, and distances between the lateral surfaces, facing the accessory, of the limiting blocks and the disk are shorter than distances between the lateral surfaces, facing the equipment body, of second bumps and the disk.

In some embodiments, the spring pressing structure includes a first cover plate, a compression spring and a second fixing screw; a stud matched with the second fixing screw extends from a central position on the end face of the side, back on to the accessory, of the disk along an axial direction of the disk; a stepped hole and two second through holes are formed in the first cover plate; the protruding portions of the two buckles extend out of the two second through holes respectively; the compression spring is arranged on the stud in the sleeving manner; the fixing screws penetrate through the stepped hole and are screwed into the stud; and when the two buckles are clamped into two clamping grooves respectively, the first cover plate contacts with the equipment body, the compression spring is in a compressed state and a screw head of the second fixing screw does not extend out of a contact surface of the first cover plate with the equipment body.

In some embodiments, the head-mounted equipment is characterized in that the connecting assembly further includes a first circuit board; the first circuit board is arranged on the spring pressing structure; a spring pin electrically connected to the equipment body is arranged on the first circuit board; and when the spring pressing structure contacts with the equipment body, the spring pin is inserted into electrical connection holes at corresponding positions in the equipment body.

In some embodiments, the equipment body includes a band assembly; the band assembly includes a support arm, a second circuit board and a second cover plate; the two clamping grooves and two third through holes are arranged on the first lateral surface of the support arm; a strip-shaped groove is arranged on the opposite lateral surface of the first lateral surface of the support arm along a direction of a connecting line of the two third through holes to accommodate the second circuit board; a second buckle is arranged at the bottom of the strip-shaped groove, a second clamping groove matched with the second buckle for use is formed in the second circuit board, and the second buckle is clamped into the second clamping groove to fix the second circuit board at the bottom of the strip-shaped groove; and electrical contact regions are arranged on the second circuit board, and the electrical contact regions are positioned in incoming directions of the two third through holes.

BRIEF DESCRIPTION OF THE DRAWINGS

In order to describe the technical solutions in the embodiments of the present invention or the prior art more clearly, the drawings required to be used for descriptions about the embodiments or the prior art will be simply introduced below. It is apparent that the drawings described below are some embodiments of the present invention. Those of ordinary skill in the art may further obtain other drawings according to these drawings without creative work.

DETAILED DESCRIPTION OF EXAMPLE EMBODIMENTS

For making the purposes, technical solutions and advantages of the embodiments of the present invention clearer, the technical solutions in the embodiments of the present invention will be clearly and completely described below in combination with the drawings in the embodiments of the present invention. It is apparent that the described embodiments are not all embodiments but part of embodiments of the present invention. All other embodiments obtained by those of ordinary skill in the art on the basis of the embodiments in the present invention without creative work shall fall within the scope of protection of the present invention.

Terms used in the embodiments of the present invention are only adopted to describe specific embodiments and not intended to limit the present invention. "A/an", "said" and "the", used in the embodiments and appended claims of the present invention, in a singular form are also intended to include a plural form, unless other meanings are clearly represented in the specification. "Multiple" usually includes at least two but does not rule out inclusion of at least one.

It is to be understood that term "and/or" used in the present invention is only an association relationship describing associated objects and represents existence of three relationships. For example, A and/or B may represent three conditions, i.e., independent existence of A, coexistence of A and B and independent existence of B. In addition, character "/" in the present invention usually represents that previous and next associated objects form an "or" relationship.

For example, terms "if" and "in case" used herein may be explained as "while" or "when" or "responsive to determining" or "responsive to monitoring", and this depends on the context. Similarly, phrase "if determining" or "if monitoring (the stated condition or event" may be explained as "when determining" or "responsive to determining" or "when monitoring (the stated condition or event" or "responsive to monitoring (the stated condition or event", and this depends on the context.

It is also to be noted that terms "include", "contain" or any other variants thereof are intended to include nonexclusive inclusions, thereby ensuring that a commodity or system including a series of elements not only includes those elements but also includes other elements which are not clearly listed or further includes elements intrinsic to the commodity or the system. Under the condition of no more restrictions, an element defined by statement "including a/an" does not exclude existence of another element which is the same in a commodity or system including the element.

Figure 1:
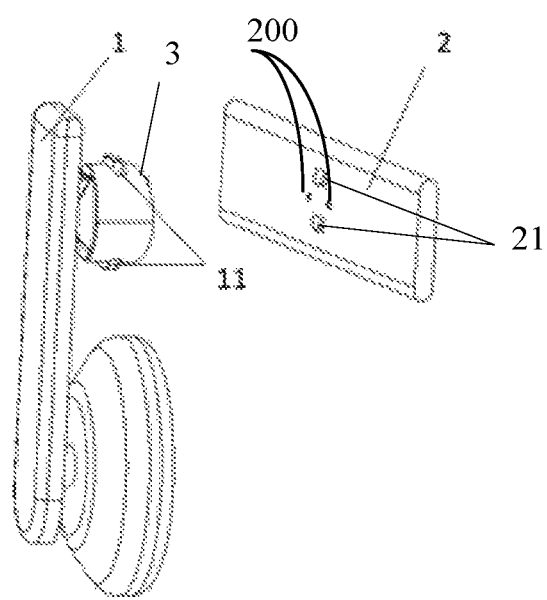
FIG. 1 is a structure diagram of a head-mounted equipment according to an embodiment of the present invention.

FIG. 1 is a structure diagram of a head-mounted equipment according to an embodiment of the present invention. As shown in FIG. 1, the head-mounted equipment includes an equipment body 2, an accessory 1 and a connecting assembly 3 implementing detachable connection between the accessory 1 and the equipment body 2. The connecting assembly 3 is arranged on the accessory 1. The connecting assembly 3 includes a buckle structure 11 and a spring pressing structure (not shown in FIG. 1). A clamping groove structure 21 adapted to the buckle structure 11 is formed in the equipment body 2. When the buckle structure 11 is clamped into the clamping groove structure 21, the spring pressing structure contacts with the equipment body 2 and applies an elastic force in a first direction to the equipment body 2. Under the action of the elastic force in the first direction, the buckle structure 11 applies pressure in a second direction to the clamping groove structure 21. The first direction is opposite to the second direction.

Figure 2:
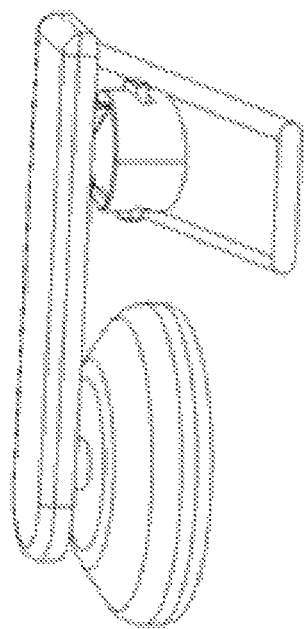
FIG. 2 is a structure diagram when an accessory is detachably connected to an equipment body according to an embodiment of the present invention.

The spring pressing structure may be a spring structure or an elastic piece structure. When the buckle structure 11 is clamped into the clamping groove structure 21, the spring pressing structure is an elastically deformed state and thus the elastic force may be generated. The buckle structure 11 includes at least two buckles. The number of the buckles may be set according to a practical requirement and will not be specifically limited in the present invention. For example, when the buckle structure 11 includes two buckles, the clamping groove structure also includes two clamping grooves matched with the two buckles. FIG. 2 illustrates a state that the buckle structure 11 is clamped into the clamping groove structure 21. That is, the accessory 1 is detachably connected to the equipment body 2.

It is to be noted that, during practical application, the accessory 1 may be a wired headset, a Bluetooth headset, a band or the like. The equipment body is not completely shown in FIG. 1. The equipment body may usually include other components such as VR glasses or AR glasses.

In the technical solutions provided in the embodiments of the present invention, the buckle structure is clamped into the clamping groove structure to implement detachable connection between the accessory and the equipment body; and moreover, under the action of the elastic force of the spring pressing structure, the buckle structure and the clamping groove structure are combined closely and prevented from being separated in a using process. Thus it can be seen that, compared with the prior art, the present invention has the advantages that the accessory may be conveniently and rapidly dismounted and mounted without any external tool and firm connection is ensured.

Figure 3:
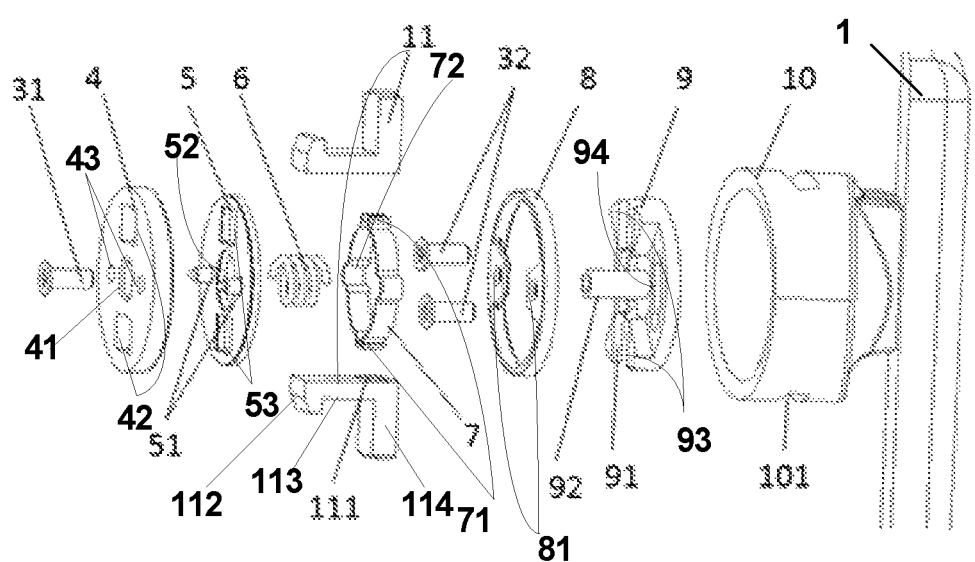
FIG. 3 is an exploded structure diagram of a connecting assembly according to another embodiment of the present invention.

Furthermore, as shown in FIG. 3, the buckle structure 11 includes two buckles and an annular elastic piece 7; and the two buckles are symmetrically arranged on an outer annular wall (not shown in the figures) of the annular elastic piece 7, and the two buckles are positioned at the two ends of the annular elastic piece 7 in a first diameter direction.

The two buckles may be arranged on the outer annular wall of the annular elastic piece 7 in form of screw, buckle, clamping groove or the like. The two buckles are oppositely arranged at the two ends of the annular elastic piece. The annular elastic piece 7 may be compressed by the two buckles to change a distance between the two buckles. The clamping groove structure 21 includes two clamping grooves and a distance between the two clamping grooves is shorter than a distance between the two buckles when the annular elastic piece 7 is in a natural state. Then, the annular elastic piece 7 may be compressed to clamp the two buckles into the two clamping grooves during mounting. In such case, the annular elastic piece 7 is in a compressed state and the two buckles may generate pressure in opposite directions on groove walls of the respectively corresponding clamping grooves respectively. Therefore, under the co-action of the pressure and the elastic force of the spring pressing structure, the buckle structure 11 and the clamping groove structure 21 may be combined more closely and prevented from being separated.

In an implementable solution, the buckle includes a direct section portion 113, as well as a protruding portion 112 and pressure applying portion 114 which are arranged at the two ends of the direct section portion 113 respectively; and each of the protruding portion 112 and the pressure applying portion 114 extends towards a direction far away from the annular elastic piece 7.

Preferably, each of the pressure applying portion 114 and the protruding portion 112 form a right angle with the direct section portion 113.

The pressure applying portions are designed to make it convenient for a user to apply pressure to elastically deform the annular elastic piece 7 through the pressure applying portions 114, thereby changing a distance between the protruding portions 112 on the two buckles and further clamping the protruding portions 112 into the clamping grooves.

During specific implementation, two first fastening structures 71 may be arranged on the outer annular wall of the annular elastic piece 7, and the two first fastening structures 71 are positioned at the two ends of the annular elastic piece 7 in the first diameter direction respectively; and second fastening structures 111 adapted to the first fastening structures 71 are arranged on the end faces, facing the annular elastic piece 7, of the two buckles.

The first fastening structures 71 are first bumps and the second fastening structures 111 are second grooves adapted to the first bumps. Or, the first fastening structures 71 are first grooves and the second fastening structures 111 are second bumps adapted to the first grooves. By fastening of the first fastening structures 71 and the second fastening structures 111, the two buckles may be connected with the annular elastic piece 7.

Preferably, semicircular elastic sections 72 protruding towards the annular outer side are arranged at two positions of the annular elastic piece 7 in a second diameter direction; and the first diameter direction of the annular elastic piece is perpendicular to the second diameter direction of the annular elastic piece. The semicircular elastic sections 72 protruding towards the annular outer side may be elastically deformed to elastically deform the whole annular elastic piece 7, so that service life of the annular elastic piece 7 may be effectively prolonged.

Considering that there may be a difference in sizes and shapes of heads of different users, if a user cannot adjust the accessory to a proper position after the accessory is connected to the equipment body, use of the user will inevitably be influenced. For example, when the accessory is a headset and if the user may not regulate receivers on the headset to fit with the ears of the user, user experiences will inevitably be influenced. Therefore, in the following embodiment, the connecting assembly 3 further includes a cylinder 10 fixed on the accessory 1 and a disk 9 accommodated in the cylinder 10; the axis of the disk 9 is overlapped with the axis of the cylinder 10; two first bumps 93 are arranged on the end face of the side, back on to the accessory 1, of the disk 9, and the two first bumps 93 are positioned at the two ends of the disk 9 in a first diameter direction respectively; a guide groove 91 is formed in each of the two first bumps 93 along the first diameter direction of the disk 9, and the pressure applying portions 114 of the two buckles are arranged in the corresponding guide grooves 91 respectively; and elongated first avoiding holes 101 extending along a circumferential direction of a cylinder wall are formed in the cylinder wall of the cylinder 10, and the pressure applying portions extend out of the first avoiding holes 101 (as shown in FIG. 1). The user may press the pressure applying portions extending from the first avoiding hole 101 to complete mounting and dismounting.

Two first avoiding holes 101 are formed in the cylinder wall, and the two first avoiding holes 101 are symmetrically formed at opposite positions of the cylinder wall. Therefore, the pressure applying portions of the two buckles extend from the respectively corresponding first avoiding holes 101 respectively. The cylinder 10 can rotate relative to the disk 9 and thus the user, after the user wearing the head-mounted equipment connected with the accessory 1, may rotate the cylinder forwards and backwards to regulate the position of the accessory.

In addition, the pressure applying portions 114 of the two buckles are arranged in the corresponding guide grooves 91 respectively and the guide groove 91 may have a guide function when the pressure applying portions 114 of the two buckles are simultaneously pressed in opposite directions (pressed along directions of the two arrows shown in FIG. 4), so that skid and dislocation of the pressure applying portions 114 in a pressure process are avoided.

During practical application, for avoiding an axial movement of the disk 9 in the cylinder 10 along the cylinder 10, an annular groove adapted to the disk may be formed in the inner side of the cylinder wall of the cylinder 10 along the circumferential direction of the cylinder wall and then the disk may be arranged in the annular groove to limit axial movement of the disk.

Considering that, during practical application, an adjustment angle required by the user is within a small range, the structure may be designed to limit the cylinder 10 to rotate relative to the disk 9 within a certain angle range. In an implementable solution, two second avoiding holes 94 are symmetrically formed in two positions of the disk 9 in a second diameter direction thereof; the two second avoiding holes 94 are cambered slotted holes concentric with the disk 9; and the disk 9 is connected with the cylinder 10 through two first fixing screws 32 inserted into the two second avoiding holes 94 respectively, and the disk 9 can rotate relative to the cylinder 10 in an angle range limited by the cambered slotted hole. The first diameter direction of the disk 9 is perpendicular to the second diameter direction of the disk 9.

It is to be noted that the axis of the annular elastic piece is overlapped with the axial direction of the disk.

Since the disk 9 and the cylinder 10 rotate relatively, the disk 9 may be considered as a stator, the cylinder is considered as a rotor, the first fixing screws 32 penetrate through the second avoiding holes 94 and are fixed on the cylinder 10, and when the cylinder 10 rotates relative to the disk 9, the first fixing screws 32 may also rotate about the disk 9 along with the cylinder 10. Since the first fixing screws 32 are limited to rotate in the angle range defined by the cambered slotted holes, the cylinder 10 may rotate relative to the disk 9 in the angle range defined by the cambered slotted holes. After rotation to a certain angle, the cylinder and the disk are kept in a stable state through a contact friction force therebetween.

If the first fixing screws 32 are adopted for limiting, the first fixing screws 32 may be loosened by frequent impact and are low in reliability.

Therefore, in an implementable solution, the connecting assembly further includes a limiting ring 8; two limiting blocks are symmetrically arranged on an inner sidewall of the limiting ring 8 along a diameter direction of the limiting ring 8, and first through holes 81 are formed in the two limiting blocks respectively; the limiting ring 8 is positioned between the cylinder 10 and the disk 9, the limiting ring 8 is sleeved on the disk 9, and the axis of the limiting ring 8 is overlapped with the axis of the disk 9; and the first fixing screws 32 sequentially penetrate through the first through holes 81 and the second avoiding holes 94 to fix the limiting ring 8 on the cylinder 10, and distances between the lateral surfaces, facing the accessory 1, of the limiting blocks and the disk 9 are shorter than distances between the lateral surfaces, facing the equipment body 8, of second bumps and the disk 9.

A rotation angle of the cylinder relative to the disk may be limited through the second bumps on the limiting ring, and the limiting ring 8 rotates along with rotation of the cylinder 10. Since the second bumps on the limiting ring 8 may collide with the first bumps before the first fixing screws reach collision positions, it can be seen that the first fixing screws are replaced with the second bumps on the limiting ring for reciprocating impact in an angle regulation process of the user, the first fixing screws are prevented from being loosened by reciprocating impact, and the reliability is improved.

Figure 4:
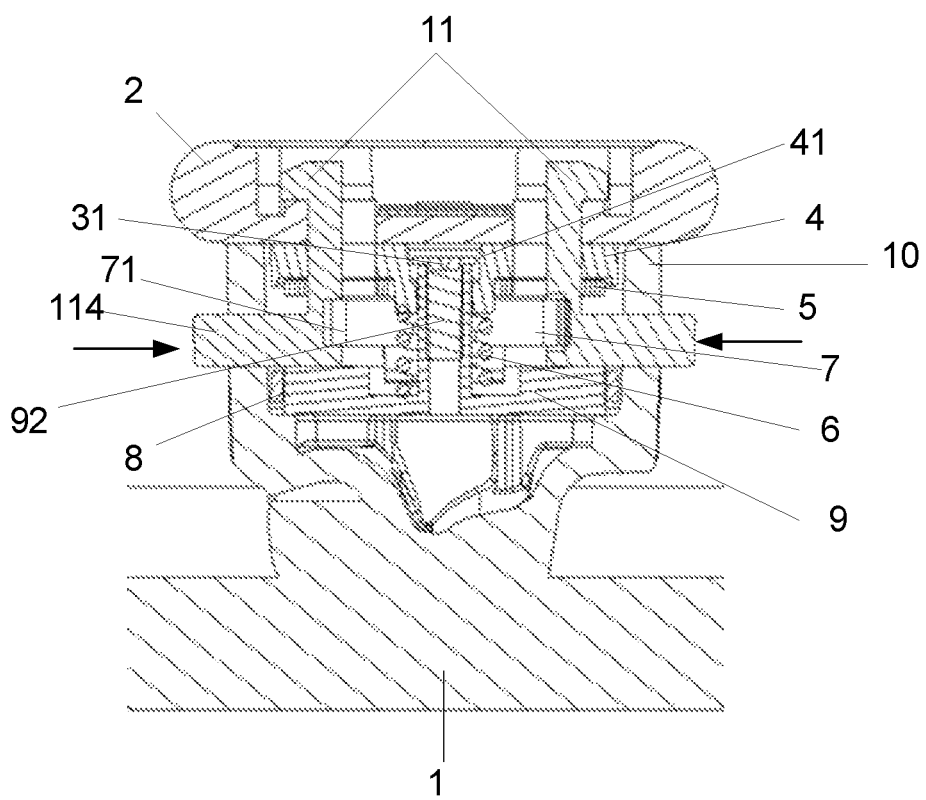
FIG. 4 is a section view in a direction of a connecting line of two buckles in FIG. 2 according to an embodiment of the present invention.
Figure 5:
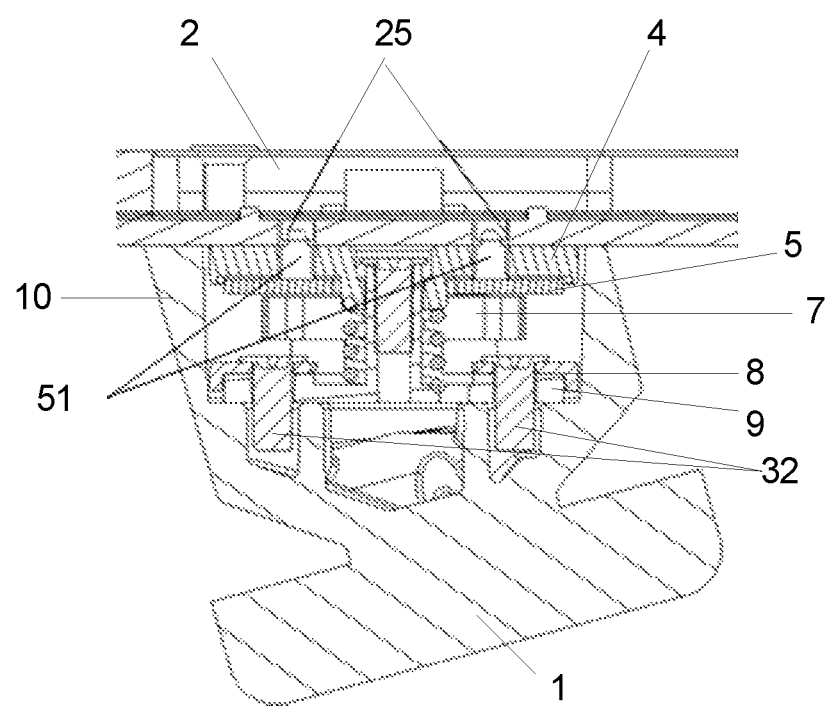
FIG. 5 is a section view in a direction of a connecting line of two electrical connection holes in FIG. 2 according to an embodiment of the present invention.

Furthermore, the spring pressing structure includes a first cover plate 4, a compression spring 6 and a second fixing screw 31; a stud 92 matched with the second fixing screw 31 for use extends from a central position on the end face of the side, back on to the accessory 1, of the disk 9 along an axial direction thereof; a stepped hole 41 and two second through holes 42 are formed in the first cover plate 4; the protruding portions 112 of the two buckles extend out of the two second through holes 42 respectively; the compression spring 6 is arranged on the stud 92 in the sleeving manner; the fixing screws 32 penetrate through the stepped hole 41 (as shown in FIG. 4 and FIG. 5) and are screwed into the stud 92; and when the two buckles are clamped into two clamping grooves respectively, the first cover plate 4 contacts with the equipment body 2, the compression spring 6 is in a compressed state and a screw head of the second fixing screw 31 does not extend out of a contact surface of the first cover plate 4 with the equipment body 2. The stepped hole is designed to avoid the screw head of the second fixing screw 31 extending from the contact surface of the first cover plate 4 and the equipment body 2 when the compression spring 6 is in the compressed state.

When the buckle structure 11 is not clamped into the clamping groove structure 21, the compression spring is in a natural state, the first cover plate 4 is not completely accommodated in the cylinder 10 and the screw head of the second fixing screw 31 does not extend from the lateral surface, facing the equipment body, of the first cover plate 4 and is at a distance, which is a preset distance, far away from the lateral surface, facing the equipment body 2, of the first cover plate 4; and when the buckle structure 11 is clamped into the clamping groove structure 21, the first cover plate 4 is completely accommodated in the cylinder 10, the second fixing screw 31 is in the compressed state and the screw head of the second fixing screw 31 still does not extend from the lateral surface, facing the equipment body 2, of the first cover plate 4, i.e., the contact surface of the first cover plate 4 and the equipment body 2. The first cover plate 4 applies the pressure in the first direction to the equipment body under the action of the elastic force of the compression spring 6, the lateral surfaces, facing the accessory 1, of the protruding portions 112 of the two buckles apply the pressure in the second direction to the corresponding sidewalls of the clamping grooves, and the first direction is opposite to the second direction. Therefore, the two buckles are firmly clamped in the two clamping grooves.

A mechanical connection between the accessory and the equipment body may be implemented through the connecting assembly provided in the abovementioned embodiments and an electrical connection, i.e., a sound signal connection, therebetween will be implemented through a circuit board below. In the following embodiment, the mechanical connection and the electrical connection between the accessory and the equipment body are independent and there is no problem of sound signal interruption caused by infirm mechanical connection. Specifically, the connecting assembly 3 further includes a first circuit board 5; the first circuit board 5 is arranged on the spring pressing structure; a spring pin 51 for electrical connection with the equipment body 3 are arranged on the first circuit board 5; and when the spring pressing structure contacts with the equipment body 3, the spring pin 51 are inserted into electrical connection holes 200 at corresponding positions in the equipment body 2.

During specific implementation, a mounting hole 52 is formed in the first circuit board 5, and the first circuit board 5 is arranged on the stud 92 in the sleeving manner through the mounting hole 52 and is positioned between the first cover plate 4 and the compression spring 6. Fourth through holes 53 are formed at positions, opposite to the second through holes 42 in the first cover plate 4, in the first circuit board 5, and the protruding portions 112 of the buckles sequentially extend from the fourth through holes 53 and the second through holes 42. Two spring pins 51 are arranged on the first circuit board 5, fifth through holes 43 are formed at positions, opposite to the two spring pins, of the first cover plate 4, and the spring pins 51 extend from the fifth through holes 43. Two electrical connection holes 200 matched with the two spring pins 51 for use are formed at the corresponding positions on the equipment body 2, and the spring pins 51 are connected with the electrical connection holes to implement electrical signal transmission between the equipment body 2 and the accessory 1. Springs are arranged in the spring pins, so that contact points may be kept in the compressed state and an electrical signal may be transmitted stably. The first circuit board 5 is a printed circuit board.

Figure 6:
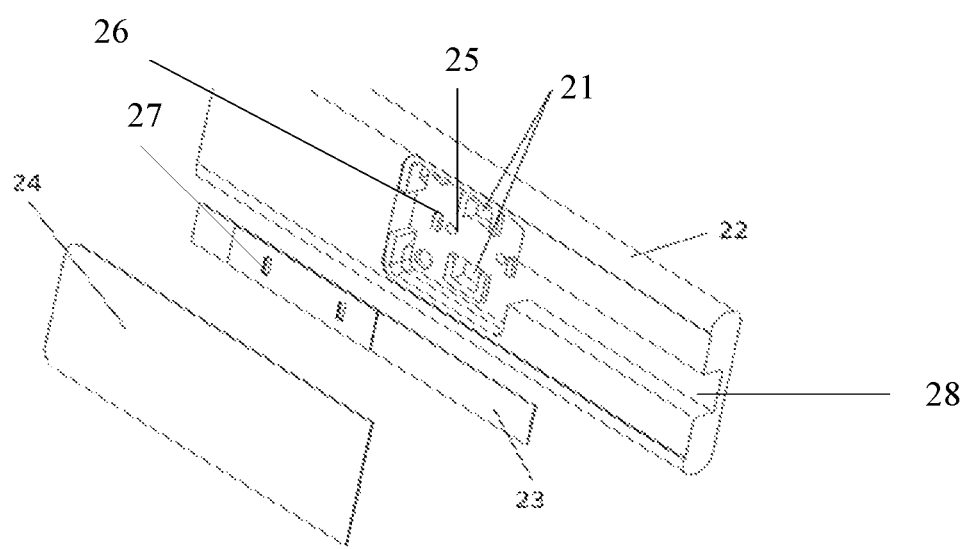
FIG. 6 is an exploded structure diagram of a band according to another embodiment of the present invention.

In another embodiment, as shown in FIG. 6, the equipment body 2 includes a band assembly; the band assembly includes a support arm 22, a second circuit board 23 and a second cover plate 24; the clamping groove clamping structure 21 (including the two clamping grooves) and two third through holes 25 are formed in the first lateral surface of the support arm 22; a strip-shaped groove 28 is formed in the opposite lateral surface of the first lateral surface of the support arm 22 along a direction of a connecting line of the two third through holes 25 to accommodate the second circuit board 23; a second buckle 26 is arranged at the bottom of the strip-shaped groove 28, a second clamping groove 27 matched with the second buckle for use is formed in the second circuit board 23, and the second buckle 26 is clamped into the second clamping groove 27 to fix the second circuit board 23 at the bottom of the strip-shaped groove 28; and electrical contact regions are arranged on the second circuit board 23, and the electrical contact regions are positioned in incoming directions of the two third through holes 25. The electrical contact regions and the two third through holes 25 form the two electrical connection holes. The second circuit board 23 may be a flexible circuit board.

In the embodiment, the accessory may be dismounted from and mounted on the VR/AR (Virtual Reality/Augmented Reality) head-mounted equipment without an additional auxiliary tool and convenience for operation is achieved. Mechanical connection and sound signal connection between the accessory and the band of the VR/AR head-mounted equipment are independent and there is no problem of sound signal interruption caused by infirm mechanical connection. Moreover, the annular elastic piece provides a constant counterforce in a third direction to ensure that the two buckles are firmly matched with the support arm in the third direction. A material for the annular elastic piece may adopt stainless steel, spring steel and the like. The compression spring provides a constant counterforce in the first direction to ensure that the two buckles are firmly matched with the support arm in the first direction. A material for the compression spring may adopt stainless steel, a piano wire and the like. The first direction is perpendicular to the third direction.

Considering that the rear parts of the ears tilt, for making the receivers of the headset fit with the ears, the end, facing the equipment body 2, of the cylinder 10 may be arranged to be a beveled end (as shown in FIG. 1 and FIG. 5). When the buckle structure 11 is clamped in the clamping groove structure 21, the beveled end contacts with the equipment body and the headset forms a preset included angle with the band. The preset included angle is a statistical average included angle between the ear surface of the ear and the head.

It is finally to be noted that the above embodiments are adopted not to limit but only to describe the technical solutions of the present invention. Although the present invention has been described with reference to the above-mentioned embodiments in detail, those of ordinary skill in the art should know that modifications may still be made to the technical solutions recorded in each embodiment or equivalent replacements may be made to part of technical features therein. These modifications or replacements do not make the essences of the corresponding technical solutions depart from the spirit and scope of the technical solutions of each embodiment of the present invention.

The invention claimed is:

1. A head-mounted equipment, comprising:
   an equipment body;
   an accessory; and
   a connecting assembly implementing detachable connection between the accessory and the equipment body, wherein:
   the connecting assembly is arranged on the accessory;
   the connecting assembly comprises a buckle structure and a spring pressing structure;
   a clamping groove structure adapted to the buckle structure is provided on the equipment body;
   when the buckle structure is clamped into the clamping groove structure, the spring pressing structure contacts with the equipment body and applies an elastic force in a first direction to the equipment body;
   under the action of the elastic force in the first direction, the buckle structure applies pressure in a second direction to the clamping groove structure; and
   the first direction is opposite to the second direction.

2. The head-mounted equipment according to claim 1, wherein:
   the buckle structure comprises: two buckles and an annular elastic piece; and
   the two buckles are symmetrically arranged on an outer annular wall of the annular elastic piece, and the two buckles are positioned at two ends of the annular elastic piece in a first diameter direction.

3. The head-mounted equipment according to claim 2, wherein:
   the buckle comprises:
   a direct section portion, a protruding portion and a pressure applying portion which are arranged at two ends of the direct section portion respectively; and
   each of the protruding portion and the pressure applying portion extends towards a direction far away from the annular elastic piece.

4. The head-mounted equipment according to claim 3, wherein:
   two first fastening structures are provided on the outer annular wall of the annular elastic piece, and the two first fastening structures are positioned at the two ends of the annular elastic piece in the first diameter direction respectively; and
   second fastening structures adapted to the first fastening structures are provided on end faces, facing the annular elastic piece, of the two buckles.

5. The head-mounted equipment according to claim 4, wherein:
   the connecting assembly further comprises:
   a cylinder fixed on the accessory and a disk accommodated in the cylinder;
   an axis of the disk is overlapped with an axis of the cylinder;
   two first bumps are provided on an end face of one side, back on to the accessory, of the disk, and the two first bumps are positioned at two ends of the disk in a first diameter direction respectively;

a guide groove is formed in each of the two first bumps along the first diameter direction of the disk, and the pressure applying portions of the two buckles are arranged in the corresponding guide grooves respectively; and elongated first avoiding holes extending along a circumferential direction of a cylinder wall are formed in the cylinder wall of the cylinder, and the pressure applying portions extend out of the first avoiding holes.

6. The head-mounted equipment according to claim 5, wherein:

two second avoiding holes are symmetrically arranged on two positions of the disk in a second diameter direction of the disk;

the two second avoiding holes are cambered slotted holes concentric with the disk;

the disk is connected with the cylinder through two first fixing screws inserted into the two second avoiding holes respectively, and the disk can rotate relative to the cylinder in an angle range defined by the cambered slotted holes; and the first diameter direction of the disk is perpendicular to the second diameter direction of the disk.

7. The head-mounted equipment according to claim 6, wherein:

the connecting assembly further comprises a limiting ring;

two limiting blocks are symmetrically arranged on an inner sidewall of the limiting ring along a diameter direction of the limiting ring, and first through holes are formed in the two limiting blocks respectively;

the limiting ring is positioned between the cylinder and the disk, the limiting ring is sleeved on the disk, and an axis of the limiting ring is overlapped with the axis of the disk; and the first fixing screws sequentially penetrate through the first through holes and the second avoiding holes to fix the limiting ring on the cylinder, and distances between lateral surfaces, facing the accessory, of the limiting blocks and the disk are shorter than distances between lateral surfaces, facing the equipment body, of second bumps and the disk.

8. The head-mounted equipment according to claim 4, wherein:

the connecting assembly further comprises a first circuit board;

the first circuit board is arranged on the spring pressing structure;

a spring pin electrically connected to the equipment body is arranged on the first circuit board; and when the spring pressing structure contacts with the equipment body, the spring pin is inserted into electrical connection holes at corresponding positions in the equipment body.

9. The head-mounted equipment according to claim 3, wherein:

semicircular elastic sections protruding towards an annular outer side are provided on two positions of the annular elastic piece in a second diameter direction respectively; and the first diameter direction of the annular elastic piece is perpendicular to the second diameter direction of the annular elastic piece.

10. The head-mounted equipment according to claim 9, wherein:

the connecting assembly further comprises:

a cylinder fixed on the accessory and a disk accommodated in the cylinder;

an axis of the disk is overlapped with an axis of the cylinder;

two first bumps are provided on an end face of one side, back on to the accessory, of the disk, and the two first bumps are positioned at two ends of the disk in a first diameter direction respectively;

a guide groove is formed in each of the two first bumps along the first diameter direction of the disk, and the pressure applying portions of the two buckles are arranged in the corresponding guide grooves respectively; and elongated first avoiding holes extending along a circumferential direction of a cylinder wall are formed in the cylinder wall of the cylinder, and the pressure applying portions extend out of the first avoiding holes.

11. The head-mounted equipment according to claim 10, wherein:

two second avoiding holes are symmetrically arranged on two positions of the disk in a second diameter direction of the disk;

the two second avoiding holes are cambered slotted holes concentric with the disk;

the disk is connected with the cylinder through two first fixing screws inserted into the two second avoiding holes respectively, and the disk can rotate relative to the cylinder in an angle range defined by the cambered slotted holes; and the first diameter direction of the disk is perpendicular to the second diameter direction of the disk.

12. The head-mounted equipment according to claim 11, wherein:

the connecting assembly further comprises a limiting ring;

two limiting blocks are symmetrically arranged on an inner sidewall of the limiting ring along a diameter direction of the limiting ring, and first through holes are formed in the two limiting blocks respectively;

the limiting ring is positioned between the cylinder and the disk, the limiting ring is sleeved on the disk, and an axis of the limiting ring is overlapped with the axis of the disk; and the first fixing screws sequentially penetrate through the first through holes and the second avoiding holes to fix the limiting ring on the cylinder, and distances between lateral surfaces, facing the accessory, of the limiting blocks and the disk are shorter than distances between lateral surfaces, facing the equipment body, of second bumps and the disk.

13. The head-mounted equipment according to claim 3, wherein:

the connecting assembly further comprises:

a cylinder fixed on the accessory and a disk accommodated in the cylinder;

an axis of the disk is overlapped with an axis of the cylinder;

two first bumps are provided on an end face of one side, back on to the accessory, of the disk, and the two first bumps are positioned at two ends of the disk in a first diameter direction respectively;

a guide groove is formed in each of the two first bumps along the first diameter direction of the disk, and the pressure applying portions of the two buckles are arranged in the corresponding guide grooves respectively; and elongated first avoiding holes extending along a circumferential direction of a cylinder wall are formed in the cylinder wall of the cylinder, and the pressure applying portions extend out of the first avoiding holes.

14. The head-mounted equipment according to claim 13, wherein:

two second avoiding holes are symmetrically arranged on two positions of the disk in a second diameter direction of the disk;

the two second avoiding holes are cambered slotted holes concentric with the disk;

the disk is connected with the cylinder through two first fixing screws inserted into the two second avoiding holes respectively, and the disk can rotate relative to the cylinder in an angle range defined by the cambered slotted holes; and the first diameter direction of the disk is perpendicular to the second diameter direction of the disk.

15. The head-mounted equipment according to claim 14, wherein:

the connecting assembly further comprises a limiting ring;

two limiting blocks are symmetrically arranged on an inner sidewall of the limiting ring along a diameter direction of the limiting ring, and first through holes are formed in the two limiting blocks respectively;

the limiting ring is positioned between the cylinder and the disk, the limiting ring is sleeved on the disk, and an axis of the limiting ring is overlapped with the axis of the disk; and the first fixing screws sequentially penetrate through the first through holes and the second avoiding holes to fix the limiting ring on the cylinder, and distances between lateral surfaces, facing the accessory, of the limiting blocks and the disk are shorter than distances between lateral surfaces, facing the equipment body, of second bumps and the disk.

16. The head-mounted equipment according to claim 15, wherein:

the spring pressing structure comprises:

a first cover plate, a compression spring and a second fixing screw;

a stud matched with the second fixing screw extends from a central position on an end face of one side, back on to the accessory, of the disk along an axial direction of the disk;

a stepped hole and two second through holes are formed in the first cover plate;

the protruding portions of the two buckles extend out of the two second through holes respectively;

the compression spring is arranged on the stud in the sleeving manner;

the fixing screws penetrate through the stepped hole and are screwed into the stud; and when the two buckles are clamped into two clamping grooves respectively, the first cover plate contacts with the equipment body, the compression spring is in a compressed state and a screw head of the second fixing screw does not extend out of a contact surface of the first cover plate with the equipment body.

17. The head-mounted equipment according to claim 3, wherein:

the connecting assembly further comprises a first circuit board;

the first circuit board is arranged on the spring pressing structure;

a spring pin electrically connected to the equipment body is arranged on the first circuit board; and when the spring pressing structure contacts with the equipment body, the spring pin is inserted into electrical connection holes at corresponding positions in the equipment body.

18. The head-mounted equipment according to claim 2, wherein:

the connecting assembly further comprises a first circuit board;

the first circuit board is arranged on the spring pressing structure;

a spring pin electrically connected to the equipment body is arranged on the first circuit board; and when the spring pressing structure contacts with the equipment body, the spring pin is inserted into electrical connection holes at corresponding positions in the equipment body.

19. The head-mounted equipment according to claim 1, wherein:

the connecting assembly further comprises a first circuit board;

the first circuit board is arranged on the spring pressing structure;

a spring pin electrically connected to the equipment body is arranged on the first circuit board; and when the spring pressing structure contacts with the equipment body, the spring pin is inserted into electrical connection holes at corresponding positions in the equipment body.

20. The head-mounted equipment according to claim 19, wherein:

the equipment body comprises: a band assembly;

the band assembly comprises a support arm, a second circuit board and a second cover plate;

the two clamping grooves and two third through holes are arranged on a first lateral surface of the support arm;

a strip-shaped groove is arranged on an opposite lateral surface of the first lateral surface of the support arm along a direction of a connecting line of the two third through holes to accommodate the second circuit board;

a second buckle is arranged at the bottom of the strip-shaped groove, a second clamping groove matched with the second buckle for use is formed in the second circuit board, and the second buckle is clamped into the second clamping groove to fix the second circuit board at the bottom of the strip-shaped groove; and electrical contact regions are arranged on the second circuit board, and the electrical contact regions are positioned in an incoming direction of the two third through holes.

\* \* \* \* \*